United States Patent [19]

Harte

[11] Patent Number: 4,561,852

[45] Date of Patent: Dec. 31, 1985

[54] COMPUTER ASSISTED TEACHING MACHINE THAT USES TWO ELECTRORESISTIVE SHEETS

[76] Inventor: J. Richard Harte, 10 W. Concord, Kansas City, Mo. 64112

[21] Appl. No.: 650,077

[22] Filed: Sep. 13, 1984

[51] Int. Cl.$^4$ .............................................. G09B 7/06
[52] U.S. Cl. .................................................. 434/339
[58] Field of Search ............... 434/339, 340, 338, 334, 434/320

[56] References Cited

U.S. PATENT DOCUMENTS

| | | | |
|---|---|---|---|
| 3,106,027 | 10/1963 | Thelen | 434/339 |
| 3,760,512 | 9/1973 | Tarnopolsky et al. | 434/339 |
| 3,771,240 | 11/1973 | Matui | 434/339 |
| 3,947,978 | 4/1976 | Clark et al. | 434/339 |
| 3,949,489 | 4/1976 | Gallucci | 434/338 |
| 4,010,553 | 3/1977 | Bennett | 434/338 |
| 4,069,597 | 1/1978 | Bigorre | 434/340 |
| 4,121,355 | 10/1978 | Kimoto et al. | 434/320 X |
| 4,164,078 | 8/1979 | Goldfarb | 434/335 |
| 4,343,474 | 8/1982 | Casey | 434/339 X |
| 4,453,920 | 6/1984 | Harte | 434/334 |
| 4,521,199 | 6/1985 | Harte | 434/339 |
| 4,522,599 | 6/1985 | Harte | 434/339 |

Primary Examiner—William H. Grieb

[57] ABSTRACT

This invention uses preprinted instructional sheets that contain multiple questions, a plurality of answer choices, and response areas adjacent to answer areas. Underlying said instructional sheets are two sheets of electroresistive film, one sheet being positioned above the other; said sheets are usually not in contact with each other except at the times and the locations when downward pressure is exerted on a response area on an overlying instructional sheet. Along one vertical margin of one resistive sheet is a conductive strip. Along one horizontal margin of the second resistive sheet is a conductive strip. The different response areas on the instructional sheets are located in a grid pattern with X and Y coordinates paralleling the X and Y coordinates of the conductive strips on the resistive sheets. Downward pressure on a response area on an instructional sheet results in a switching action when one resistive sheet contacts the other, said switching action resulting in two different resistances being generated, and these two separate resistances identify the X and Y grid coordinates where the downward pressure occurred. The computer's memory has been preprogrammed to identify the correctness or incorrectness of this response area, and this information is fed back to the student, or this information may be used only for testing purposes.

5 Claims, 9 Drawing Figures

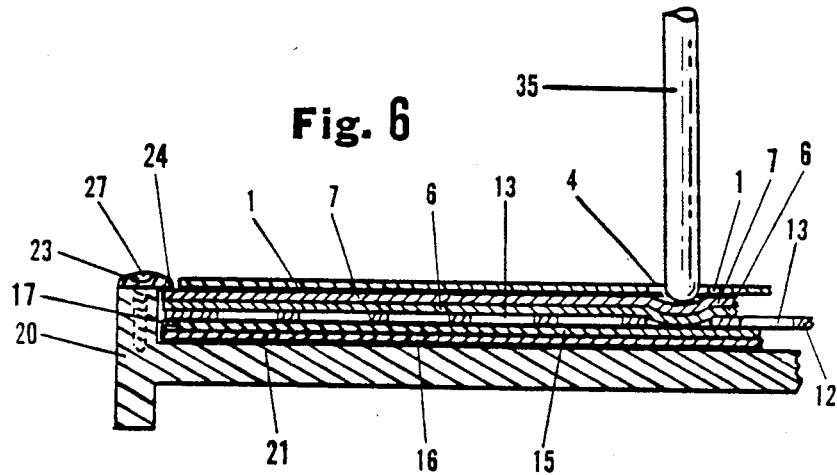
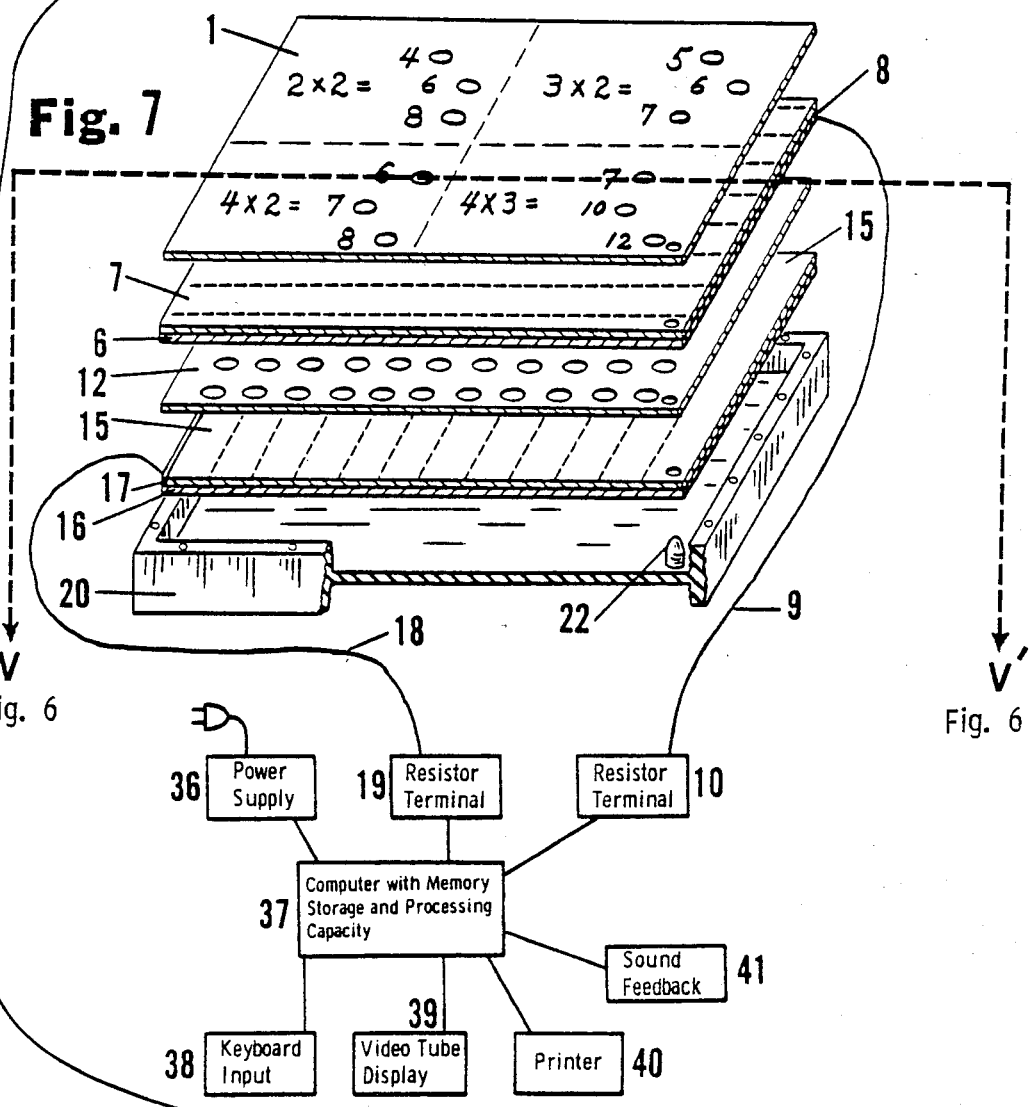

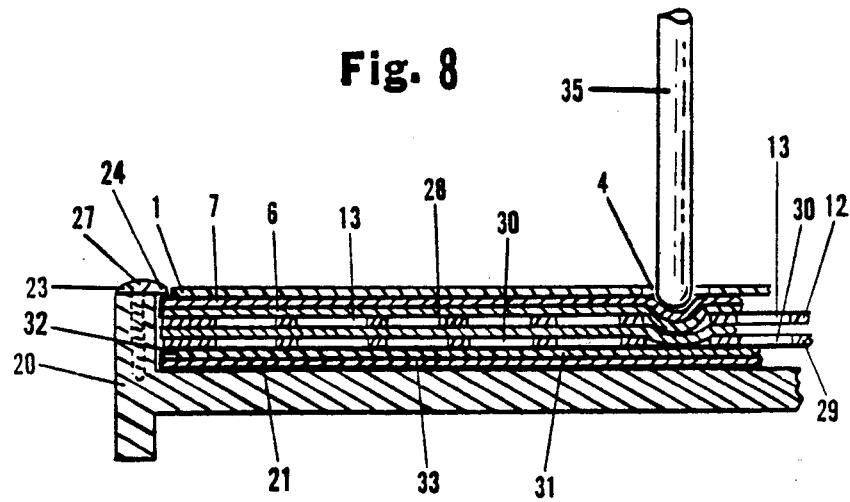
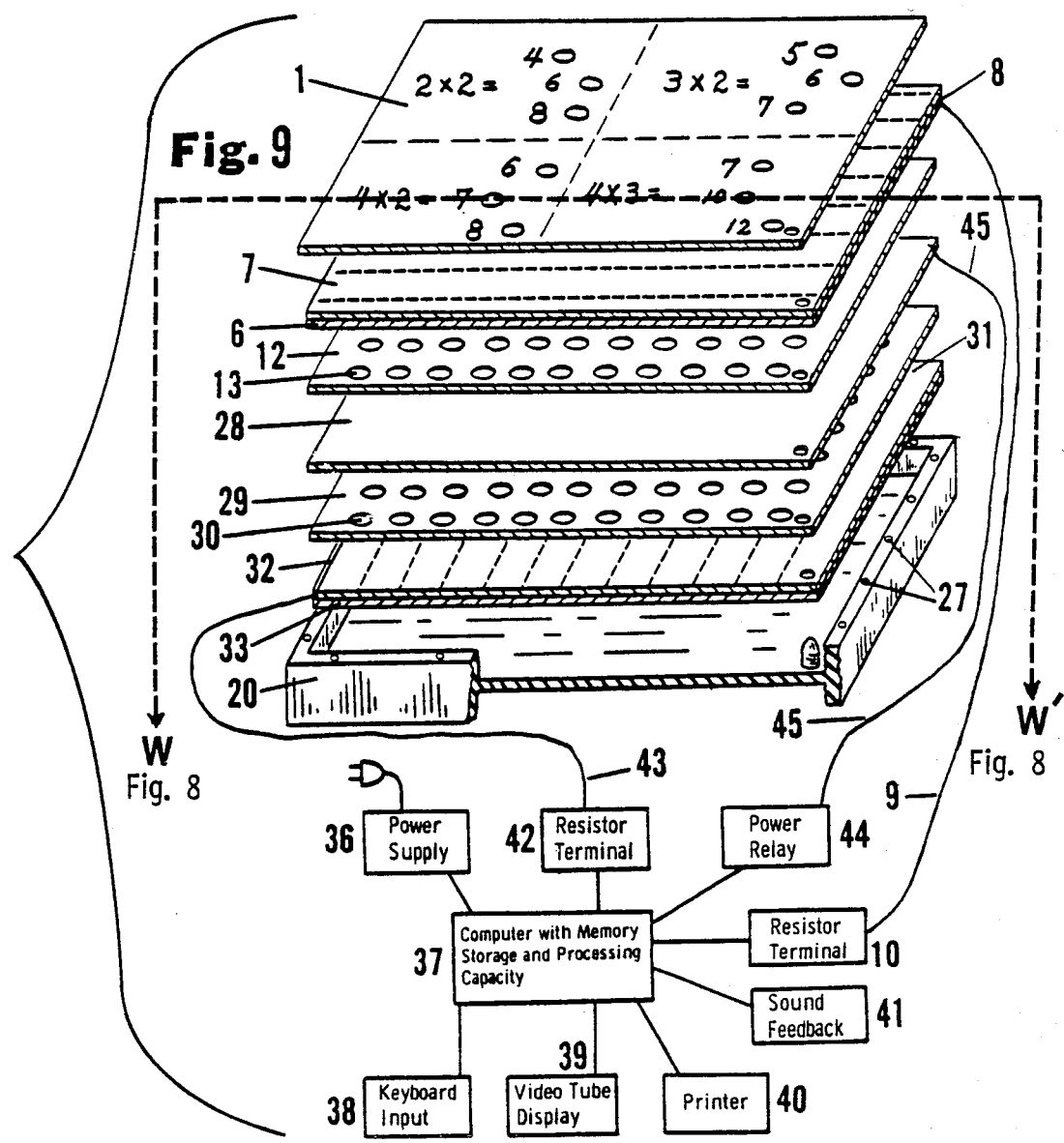

COMPUTER ASSISTED TEACHING MACHINE THAT USES TWO ELECTRORESISTIVE SHEETS

PRIOR ART

U.S. Pat. No. 3,106,027—Thelen
U.S. Pat. No. 3,771,240—Matui
U.S. Pat. No. 3,760,512—Tarnoplsky
U.S. Pat. No. 3,947,978—Clark
U.S. Pat. No. 3,949,489—Galucci
U.S. Pat. No. 4,010,553—Bennett
U.S. Pat. No. 4,069,597—Bigorre
U.S. Pat. No. 4,121,355—Kimoto et al.
U.S. Pat. No. 4,164,078—Goldfarb
U.S. Pat. No. 4,343,474—Casey
U.S. Pat. No. 4,453,920—Harte
Harte—pending application—filing date—8/29/83—Ser. No. 527,427
Harte—pending application—filing date—10/11/83—Ser. No. 540,636
Harte—pending application—filing date—11/23/83—Ser. No. 554,692

SUMMARY OF THE DISCLOSURE

This invention is an improvement in instructional and testing apparatus of the type that provides immediate feedback to students as to the correctness or incorrectness of their responses, and incorporates a computer as a way of processing, evaluating, recording a student's responses and giving immediate feedback to the student as to the correctness of their response. By alterating the operation of the mechanism slightly so that it does not give feedback to the student, it can be used in the test only mode of operation, and information about the student's performance is then only made available to the instructor or evaluator. In the prior art cited above, a variety of ways have been utilized to locate a grid pattern, where some of the points of intersection of X and Y coordinates of this grid are designated as correct response areas, and where the remaining grid coordinates of X and Y axes are designated as incorrect response areas.

This invention uses a different method of locating the X and Y coordinates of a grid pattern from the methods described in the previous art. In this invention two sheets of electroresistive film are used to locate the X and Y coordinates of a grid. In this invention it is the different electrical resistances that can be obtained from different distances of travel of an electric current along an electroresistive sheet that provides the information that locates the exact site on a grid of X and Y coordinates where downward pressure was exerted on these resistant sheets to close one or more electric circuits. In this invention a preprinted instructional sheet overlies both electroresistive sheets. Printed on this instructional sheet are: questions; a plurality of answers; and answer areas there are printed adjacent to each answer. The answer areas are arranged in a grid pattern. In this invention the two sheets of electroresistive material are held apart except when downward pressure is exerted at an answer area on an overlying instructional sheet. This downward pressure is then transmitted to the top elastic and electroresistive sheet which causes it to be deflected in a downward direction to contact an underlying resistive sheet and thereby close an electrical circuit. It is the different electrical resistances that are produced in the two different electroresistive sheets at different X and Y coordinates of the grid that locates the site on the instructional sheet where the downward pressure occurred. Thus any point on the grid of X and Y coordinates can be defined by the different electrical resistance values in ohms that are obtained when downward pressure closes one or more circuits. Two variations of this invention are presented. In the first variation the top elastic and electroresistive sheet directly contacts the bottom electroresistive sheet and it is the sum of the two electrical resistances that are obtained that identifies which of the answer areas was depressed. In the second variation of this invention, an elastic and highly electroconductive sheet is sandwiched between the top and bottom electroresistive sheets. In this second variation the resistances in the top and bottom electroresistive sheets are processed independently to define the X and Y coordinates where the downward pressure on an answer area occurred.

In a rectangular electroresistive sheet, if a highly conductive strip is securely attached to one edge the electrical resistance as measured in ohms between that conductive strip and any point on the electroresistive sheet will be directly related to the distance traveled across the surface of the resistive sheet by the current. Thus paralleling the conductive strip will be rows of points where the electrical resistances will all be the same for each row. A large number of such rows of points is available on an electroresistive sheet. When one has two electroresistive sheets, one located above the other, and when one attaches a conductive strip along the horizontal edge of one sheet, and also attached a conductive strip along the vertical edge of the second sheet, you have provided a way to define a grid pattern of X and Y coordinates by the use of different electrical resistance values. In this invention these different electrical resistance values are used to identify correct and incorrect response areas. Two different variations of this invention are illustrated, described, and claimed in this application. In the first variation of this invention which includes FIGS. 1 through 7, downward pressure at an answer area on an instructional sheet results in the downward deflection of the top elastic and electroresistive sheet which causes it to contact the bottom electroresistive sheet, there by closing one electric circuit that contains two separate electrical resistance values that are linked in a series type of electrical circuit. By having one sheet of electroresistive material of far greater resistance than the other, the summing of the two electrical resistances in the series electrical circuit can clearly identify both the source of the lesser and the greater resistance. In the second variation of this invention which includes FIGS. 8 and 9, a highly conductive elastic sheet is sandwiched between the top and the bottom electroresistive sheets. In this second variation, downward pressure at an answer area on an instructional sheet first results in the top elastic electroresistive sheet contacting the elastic and highly conductive sheet, there by closing the first circuit. With continued downward pressure the elastic and conductive sheet moves downward to contact the bottom electroresistive sheet, there by closing a second electric circuit. In this second variation, the individual resistances are processed independently, one to determine which X coordinate was involved, and the other to determine which Y coordinate was involved. These two grid coordinates then determine which answer area was depressed, and this information is then compared with information stored in the computers memory as to whether this was correct or an incorrect response. When this apparatus is used as a teaching machine, this information is then fed immediately back to the student. When this apparatus is used as a testing mechanism, this information is not fed back to the student, but is kept in the computer's memory, and is given to the instructor or teacher when so directed by the instructor or evaluator. The instructional sheets used with this invention may have the answer areas printed on them, or the answer areas may be punched out areas that enable the same instructional sheets to be used on this teaching machine, and also on the much simpler and nonelectronic teaching machine that the inventor is currently producing under different U.S. Patents.

BACKGROUND AND OBJECT OF THE INVENTION

The object of this invention relates to an improvement in instructional and testing apparatus noted in the prior art. In recent years computers and related hardware and software have become much less expensive so that now home computers are commonplace. The present invention provides a way that these less expensive computers can be utilized in the instructional process as much of the information that would noramlly be stored in the computers memory can be presented in a variety of printed formats. In addition, the same preprinted instructional sheets that are in current use on a simple, nonelectronic teaching machine can also be used on a properly designed and manufactured teaching machine of the type described in this patent application. By the use of the simpler non-electronic teaching machine in conjunction with a more expensive computer linked teaching machine, this combination would provide a considerable cost savings for the regular classroom. With the use of this combination, a student could use the less expensive teaching machine for routine practice and drill, and the teacher could then select some of the instructional sheets for the student to respond to on the computer linked teaching machine in place of giving the student a standard test which the teacher has to grade. The students responses on those instructional sheets that are selected by the teacher as the test would then be stored in the computers memory and printed out for the teacher on command of the teacher. This would also result in a saving of the teacher's time, as less time would be spent in grading tests. The computer could also be programmed to do a number of different analytic processes on the data placed in it's memory, or stored on tapes or discs. When used by the student in a classroom, this teaching machine and testing apparatus could be used in either the immediate feedback (teaching) mode, or in the no immediate feedback (testing) mode.

Part of the background of this invention has to do with the construction and production of electrical resistance material in sheet or film form. The most common type of electrical resistors are those constructed in rod or bar form with wires extending from each end. Other types of resistors are constructed to have different degrees of electrical resistance. Resistors can be constructed from coils of resistive wire and taps are placed at intervals along such a resistive coil to give a number of different resistances from the same coil. Variable resistors such as are used in the volume control of a radio are often constructed from a band of resistive material that has been formed into an incomplete ring. And located at the central axis of this ring is a conductive shaft with an attached conductive arm that sweeps around the inside of this ring as the shaft is rotated, thus providing a great degree of variation in electrical resistance from one position to another. Elastic sheets or films of resistive material are produced by mixing elastic polymers with electrically resistive materials in different ratios. The amount of electrical resistance per unit of distance on the sheet can varied by (1.) useing different resistive materials; (2.) useing different ratios of nonconductive elastic polymers and a given resistive material; and (3.) by extruding the resistive films or sheets in different thicknesses. When a rectangular sheet of resistive material has a highly conductive strip attached along one edge, then the resistance value of any point on that sheet (providing it is of uniform construction and thickness) to this conductive strip is directly related to the distance between the point and the conductive strip. When this conductive strip is attached in a straight line along one edge of the resistive sheet, then all points of equal distance from this strip will have the same resistance values, and these points will also fall in a straight line. With this arrangement, if row of points "B" is one half the distance to the edge of the conductive strip as compared to row of points "C", then the electrical resistance along row of points "B" will be one half the value of row of points "C" when the resistance is measured between these two rows of points and the conductive strip. In a like manner, if row of points "D" on this resistive sheet is three times the distance from the conductive strip as row of points "B", then the electrical resistances along line of points "D" will be three times as great as the electrical resistance along row of points "B".

One of the objects of this invention is to utilize the different electrical resistance values that can be obtained in the manner described above to define the X and Y coordinates of a grid pattern. The X and Y coordinates of this grid pattern have points of intersection that correspond to the grid pattern used as answer areas on instructional sheets that are place over two electroresistive sheets. Said electroresistive sheets are place one above the other, but normally are only in contact with each other when downward pressure is exerted at an answer area on an overlying instructional sheet. The different resistance values obtained from downward pressure on points at different locations on this grid are used in conjunction with a computer to give students feedback as to their correct and incorrect responses, and this information is also stored in the computers memory for later further evaluation.

BRIEF DESCRIPTION OF THE DRAWINGS

FIG. 6 is a cross sectional view of the components shown in FIGS. 1, 2, 3, 4 and 5, when the components are properly alligned within the holding frame. This view is along broken line V—V' FIG. 7.

FIG. 7 is an exploded view of the components shown in FIGS. 1 through 5, and a diagramatic view of the linkage of these components with a computer and related hardware.

FIG. 8 is a cross sectional view that is similar to FIG. 6, it has been taken along broken line W—W' of FIG. 9, and it shows the mode of operation of the second variation of this invention.

FIG. 9 is an exploded view of FIG. 8 plus a diagramatic view of the linkage of these components with the computer and its related hardware.

DETAILED DESCRIPTION OF THE DRAWINGS

Figure 1:
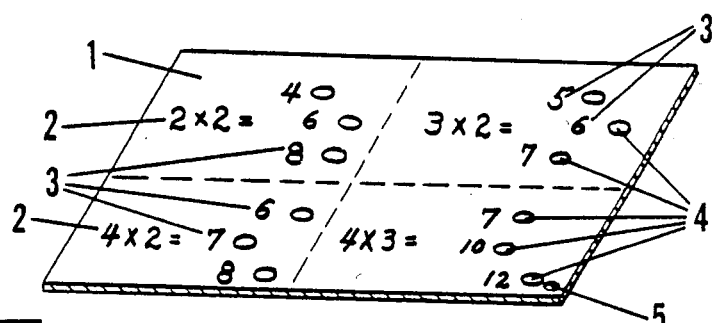
FIG. 1 is a preprinted instructional sheet.

FIG. 1: In FIG. 1, 1 is an instructional sheet on which are printed problems 2, a multiplicity of answers 3, and which contains response areas 4, and a positioning hole 5.

Figure 2:
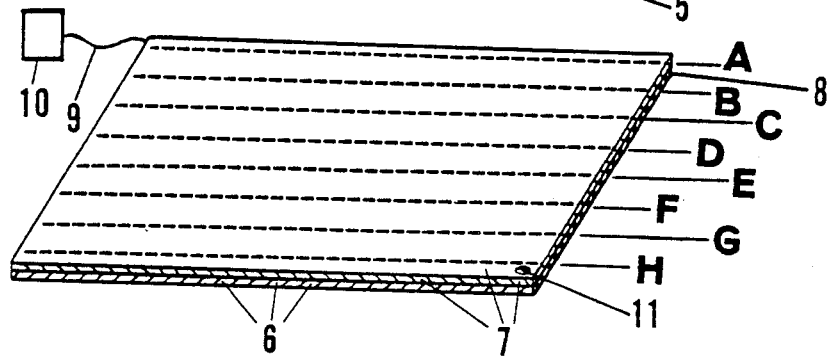
FIG. 2 is an electroresistive sheet bonded to a nonconductive sheet.

FIG. 2: In FIG. 2, 6 is an elastic sheet of electroresistive material which is bonded to the undersurface of elastic and nonconductive sheet 7, and which has an electroconductive strip 8 attached along one horizontal edge. A positioning hole 11 penetrates both sheets 6 and 7, and is on the opposite edge of these sheets as is conductive strip 8. Broken line A represents the leading edge of conductive strip 8 as it is attached to sheet 6. Broken lines: B, C, D, E, F, G, and H are parallel to broken line A and are at equal intervals from broken line A and represent incremental steps of increasing electrical resistance that are present in rows as points of resistance progressively become more distant from broken line A. Broken line B represents a row of points on sheet 6 where the electrical resistances from leading edge A of conductive strip 8, are all of the same value. In a like manner, the electrical resistances between all points in a line of points indicated by broken line C, and leading edge A, are of the same value when measured in ohms. In a similar manner broken lines, D, E, F, G, and H represent points where the resitance values are the same for a given broken line when the resistance is measured between leading edge A of conductive strip 8 and the points on that particular broken line. Wire 9 connects conductive strip 8 with resistor terminal 10.

Figure 3:
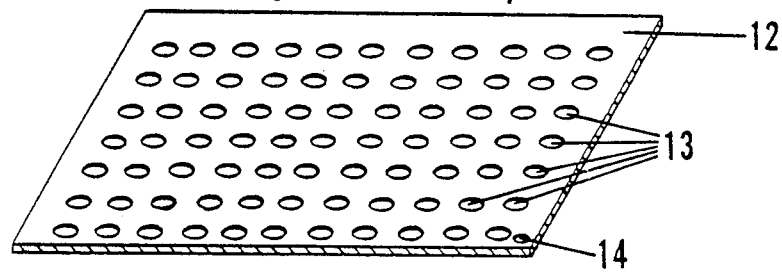
FIG. 3 is a nonconductive sheet with a grid of through holes.

FIG. 3: In FIG. 3, 12 is a nonconductive sheet of material that contains through holes 13. Holes 13 are arranged in a grid pattern with their centers corresponding to the points of intersection of broken lines B through H in FIG. 2, and broken lines J through T of FIG. 4, when these sheets are properly positioned within the holding frame illustrated in FIG. 5. Positioning hole 14 is near one corner of sheet 12, and allows for proper allignment of sheet 12 within the holding frame.

Figure 4:
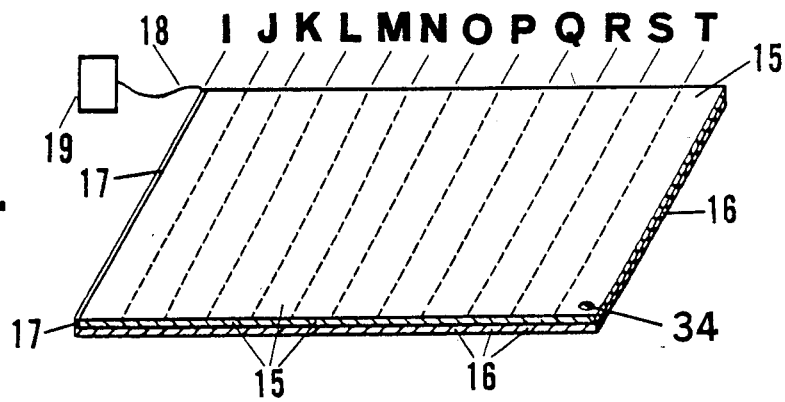
FIG. 4 is a second electroresistive sheet.

FIG. 4: In FIG. 4, 15 is a sheet of electroresistive material that overlies and is bonded to the upper surface of nonconductive sheet 16. Along one of the vertical edges of electroresistive sheet 15 is attached conductive strip 17 that has a leading edge that is designated by the letter I. Wire 18 connects conductive strip 17 to resistor terminal 19. Broken lines J through T represent intervals of equal increments from leading edge I of conductive strip 17, progressing from left to right along the surface of electroresistive sheet 15. The resistance is the same for all points along broken line J and the leading edge I of conductive strip 17. In a similar manner, when measurement against leading edge I of conductive strip 17, all points along broken lines: J, K, L, M, N, O, P, Q, R, S, and T have the same resistance for that particular line. Since broken lines J through T are placed at equal increments from leading edge I of conductive strip 17, the resistance values of the columns of points represented by these broken lines will also be in equal increments when measured against leading edge I of conductive strip 17. Through hole 34 is in a corner that is distant from leading edge I of conductive strip 17. Through hole 34 is to assure proper allignment of sheets 15 and 16 within the holding frame shown in FIG. 5.

Figure 5:
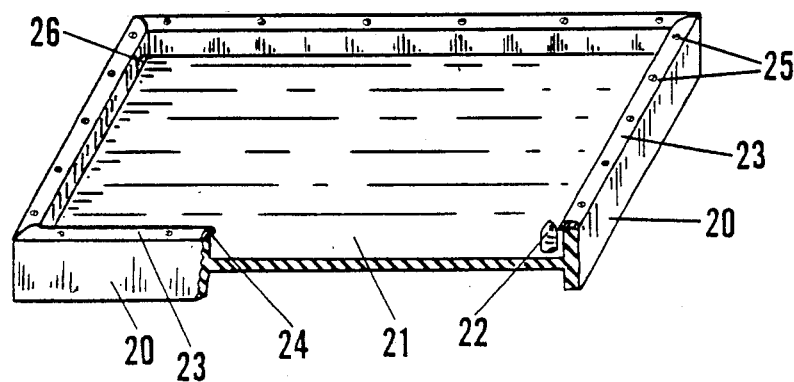
FIG. 5 is a holding frame.

FIG. 5: In FIG. 5, 20 indicates the side walls of a holding frame, 21 indicates the bottom of this holding frame, and 22 is a positioning peg that comes up from the bottom in one of the corners. This positioning peg 22, permits the other components of this invention, including a variety of instructional sheets 1, a sample of which is illustrated in FIG. 1, to be properly alligned and positioned within side walls 20 in a rapid manner. Upper rim 23 has overhang 24 that captures and keeps in permement position the sheets of material shown in FIGS. 2, 3, and 4. The inner aspect of upper rim 23 keeps instructional sheets 1 in proper allignment above the other components when hole 5 through sheet 1 is positioned over peg 22, yet rim 23 permits the rapid removal and replacement of a variety of instructional sheets 1, as the instructional sheets are not captured by overhang 24—this is best illustrated in FIGS. 6 and 8. Fasteners 25 hold upper rim 23 in place on side wall 20 of the holding frame. Through hole 26 provides a means of exit for wire 9 in FIG. 2 and for wire 18 in FIG. 4 from the interior of the holding frame.

FIG. 6: FIG. 6 is a cross sectional view of the components illustrated in FIGS. 1 through 5, along with a stylus 35 that is exerting downward pressure at a response area 4 in an instructional sheet 1. FIG. 6 shows stylus 35 exerting downward pressure on nonconductive sheet 7 which is bonded to resistive sheet 6. This downward pressure on sheets 7 and 6 causes them to be momentarily deflected through a hole 13 in a nonconductive sheet 12 that contains a grid of through holes 13. This downward pressure on elastic sheets 7 and 6 by a stylus 35, or by other means such as a finger tip, causes electroresistive sheet 6 to make contact with electroresistive sheet 15 there by resulting in a switching action that occurs at this particular site on these two electroresistive sheets. This switching action results in the generation of two different electrical resistances. In this version of the invention, these two electrical resistances are summed to identify the site where the switching action occurred. The electrical resistance that is produced by electroresistive sheet 6 is determined by the distance between the leading edge A of conductive strip 8 illustrated in FIG. 2, and the point on the sheet where the switching action occurred on sheet 6. Holes 13 in nonconductive sheet 12, illustrated in FIG. 3, can be varied in size to more broadly or more sharply define the electrical resistance values that can be obtained at any of the grid coordinates whose centers correspond to the centers of holes 13 in nonconductive sheet 12. The electrical resistance value that is produced in electroresistive sheet 15 is determined by the distance between the leading edge I of conductive strip 17 and the site at which the switching action occurred on sheet 15. The size of the hole 13 in nonconductive sheet 12 "fine tunes" the resistance values obtained at the sites where switching actions can occur as a result of downward pressure at the X and Y grid coordinates; one resistance value being produced in elastic and electroconductive sheet 6, and a second resistance value being produced in electroresistive sheet 15. By constructing one electroresistive sheet to have a ten or twenty fold greater electrical resistance per unit of distance on it's surface, two quite different resistance values can be obtained which can be summed. The electrical resistances in the two electroresistive sheets can be varied so that no two grid coordinates have the same resistance value. This allows a computer program to identify the particular site where a switching action occurred in this first variation of this invention.

FIG. 6 also shows the physical—space arrangement of the different sheets of material used in this invention, and shows the relationship of these sheets to the holding frame side wall 20, bottom of holding frame 21, and rim 23 with an over hanging edge 24, which retains sheets: 7, 6, 15, and 16 permanently in position within the holding frame. Instructional sheet 1, can be easily inserted and easily removed from within the inner edges of rim 23.

FIG. 7: In FIG. 7, the components of this invention illustrated in FIGS. 1 through 5 are shown in an exploded view along with a diagram showing the electrical—computer linked components of this invention. In FIG. 7, 1 is any of a variety of instructional sheets that can be used with this invention; 6 is an elastic and electroresistive sheet that is bonded to the undersurface of nonconductive sheet 7; 8 is a conductive strip that is attached to the upper edge of sheet 6; 12 is a nonconductive sheet that contains a grid of through holes 13; 15 is an electroresistive sheet that has a conductive strip 17 attached to its right margin; and 16 is a nonconductive sheet bonded to the under surface of sheet 15. In FIG. 7, the above mentioned components are arranged above a holding frame that has lateral side walls 20 to hold these components in position in conjunction with peg 22 that protrudes upward from the bottom surface of this holding frame. FIG. 7 also shows the electrical linkages between computer 37 and power supply 36; resistor terminals 10 and 19; keyboard input 38; video tube display 39; printer 40; and sound feedback 41. FIG. 7 also shows electrical connection 9 between conductive strip 8 and resistor terminal 10 and electrical connection 18 between conductive strip 17 and resistor terminal 19. Electrical circuitry within resistor terminals 10 and 19 are designed to sharply define specific resistance values from a set of resistances that have been assigned to that set of grid coordinates. Without this property of sharp specification of specific resistance values for a set of grid coordindates the slight variations that would be obtained from any set of grid coordinates when they are summed, would cause confusion in the processing of the resistance values that are obtained and summed.

FIG. 8: In FIG. 8 and FIG. 9 are presented the second variation of this invention. This second variation is in many respects similar to the first variation illustrated and described previously. The primary difference in this second variation is that the two resistance values that are produced are processed separately prior to being sent to the computer rather than being summed and sent to the computer as one resistance value, as is done in the first variation. FIGS. 8 and 9 show the variations in construction that permit this different way or processing the two resistance values that are obtained. FIG. 8 is a cross sectional view of this second variation, and in may respects FIG. 8 is similar to FIG. 6. In FIG. 8, Instruction sheet 1 has an answer area 4 at which a stylus 35 is exerting downward pressure on nonconductive sheet 7 and electroresistive sheet 6 which is bonded to the underside of sheet 7. Both sheet 7 and 6 are elastic. Nonconductive sheet 12 which contains a grid of through holes 13, is positioned between sheet 6 and elastic and highly conductive sheet 28. Beneath sheet 28 is nonconductive sheet 29 that contains a grid of through holes 30. Sheet 29 is in all respects identical to sheet 12, except for its position in the layering of the sheets. Beneath nonconductive sheet 29 is located electroresistive sheet 31, which has a conductive strip 32 attached to its left margin. Nonconductive sheet 33 is bonded to the under surface of sheet 31. Sheets 31 and 33 are in most respects identical to sheets 15 and 16 illustrated and described previously in FIGS. 4, 6, and 7. FIG. 8 shows the manner by which side walls 20 and bottom 21 of the holding frame, in conjunction with rim 23, holds the different components within the holding frame, except for instructional sheets 1, which are easily positioned and removed in the manner described previously. FIG. 8 also illustrates how stylus 35, or similar downward pressure—as by a finger, causes two electrical circuits to be closed with one stroke of downward pressure. Downward pressure on sylus 35 at an answer area 4, first causes elastic sheets 6 and 7 to be deflected downward through a hole 13 in nonconductive sheet 12 to contact highly conductive sheet 28 which is also elastic. This closes the first circuit. The resistance from this first circuit is determined by the linear distance between this point of electrical closure and the conductive strip 8, that is attached along the upper edge of electroresistive sheet 6. Continued downward pressure on stylus 35 cause elastic and highly conductive sheet 28 to contact electroresistive sheet 31, which closes the second circuit. The resistance from this second circuit is determined by the linear distance from the leading edge of conductive strip 32 to the points of contact.

FIG. 9: FIG. 9 shows the combination of the components shown in FIG. 8 and the computer and related hardware as they are utilized in the second variation of this invention. FIG. 9 does not show the upper rim 23 of the holding frame, but the position and function of this rim 23 is shown and illustrated in FIG. 8, and has been described in previous FIGS. FIG. 9 differs from FIG. 7 in several respects. In FIG. 9 an elastic and highly conductive sheet 28 plus a nonconductive sheet 29 with a grid of through holes 30 have been placed between the two electroresistive sheets. The insertion of these two additional sheets, plus an additional electrical connection by wire 45 and power relay 44, provide a way where the two electrical resistance values that are obtained can be processed independently, rather than as by the summing of the two resistance values as in the first variation of this invention. The advantage of this second variation is that it will permit simpler and less expensive circuitry in the resistor terminals. In FIG. 9, 1 is an easily removable instructional sheet; 6 is an elastic and electroresistive sheet that is bonded to the under surface of elastic sheet 7, and has along its upper edge a conductive strip 8; 12 is a nonconductive sheet with a grid of through holes 13; 28 is an elastic and highly conductive sheet that is connected to computer 37 via power relay 44 and connecting means 45; 31 is an electroresistive sheet that is bonded to an underlying nonconductive sheet 33, and that has a conductive strip 32 along its left margin. The above sheets, with the exception of sheet 1, the instructional sheet, are held within the walls 20 of a holding frame in the same manner as is described for FIG. 7. In this second variation of the invention, power relay 44 provides highly conductive and elastic sheet 28 with current by way of cable 45. In this second variation of the invention, nonconductive sheet 29 with through holes 30 underlies highly conductive and elastic sheet 28. Electroresistive sheet 31 underlies sheets 28 and 29, and is bonded to nonconductive sheet 33, and has a conductive strip 32 anong the left hand edge. Conductive strip 32 is linked to resistor terminal 42 by cable 43. Conductive strip 8 is linked to resistor terminal 10 by cable 9. In this second variation of this invention, separate resistance inputs are sent to computer 37 from resistor terminal 10 and resistor terminal 42, and computer 37 processes two independent resistances, one to locate the position of downward pressure on the stylus on the X axis of the grid pattern, and the second resistance to locate the Y axis of downward pressure on the stylus. Thus one resistive sheet gives a resistance that indicates one of the coordinates of a grid pattern, and the second resistive sheet give a resistance that indicates the other coordinate of a grid pattern where the downward pressure was exerted.

What is claimed as new in this invention is

1. A teaching and testing machine that incorporates: an industrial sheet; two electroresistive sheets; a computer and related hardware; and electrical circuitry to link the electrical components;

where the instructional sheet contains questions and a multiplicity of answers with response areas adjacent to said answers;

where said instructional sheet lies over two electroresistive sheets in a parallel plane with said resistive sheets;

where the two said electroresistive sheets are linked to a computer and related hardware by electric circuit means;

where said two electoresistive sheets define X and Y coordinates of a grid by the use of a gradient of electrical resistance that is an intergral part of the substance of each of the two electroresistive sheets;

where each of the two electroresistive sheets normally only make contact with other electroconductive material to result in a switching action when downward pressure is exerted at a response area on an instructional sheet, said pressure also resulting in downward pressure on a top elastic and electroresistive sheet which then contacts underlying electroconductive material to close one or more electrical circuits;

and when this downward pressure at a response area results in the generation of electrical resistances which define the specific X and Y coordinates at which this downward pressure occurred;

where said specific X and Y coordinates are determined by resistances from the intrinsic electrical resistance properties of the electroresistive sheets;

and where it is the incremental resistance values of the electroresistive sheets that form gradients of electrical resistance that can be used to define the X and Y coordinates of a grid pattern on the two electroresistive sheets;

and where electric circuit means sends the information as to the site of downward pressure to the computer for it's memory to evaluate the correctness or incorrectness of the student's responses at different response areas and on different instructional sheets;

and where the computer and related hardward send information back to the student as to the correctness or incorrectness of his or her response choices;

and where the computer also retains this information in its memory for later evaluation of a student's performance, and reporting this performance back to the teacher, evaluator, or tester.

2. The invention as defined in claim 1, where downward pressure on the top electroresistive sheet causes it to directly contact a second underlying electroresistive sheet, there by closing an electric circuit that contains two separate electric resistances, one resistance in the top electroresistive sheet, and the second resistance in the underlying electroresistive sheet;

and where these two different resistances are summed in a series circuit;

and where said summed resistance values indicate to the computer's memory the specific sites on the grid of X and Y coordinates where the downward pressure occurred; this information being processed by the computer and related circuits and hardware to give feedback to students as to their correct and incorrect responses.

3. The invention as claimed in claim 1, where there is an elastic and highly conductive sheet of material between the two sheets of electroresistive material; and where downward pressure on a response area on an instructional sheet causes the closure of two circuits;

and where each circuit generates its own resistance value, and where the said two resistance values correspond to the X and Y coordinates where the downward pressure occurred on the instructional sheet.

4. The invention as claimed in claim 2, where the two electroresistive sheets are normally separated from each other by a nonconductive sheet of material that has a grid of through holes in it, said through holes having their centers at points of intersection of X and Y coordinates of the electroresistive sheets; and where the size of the through holes in these nonconductive sheets can be varied to increase or decrease the sensitivity of the resistance values obtained when the top electroresistive sheet contacts the bottom electroresistive sheet.

5. The invention as claimed in claim 3, where the two electroresistive sheet are normally separated from an elastic and highly electroconductive sheet that has been sandwiched between them by two nonconductive sheets that each have a grid of through holes in them, the centers of said grid of through holes having their centers at the points of intersection of the X and Y coordinates of of the electroresistive sheets; and where the size of the through holes in these nonconductive sheets can be varied to increase or decrease the sensitivity of the resistance values obtained when each of the electroresistive sheets contacts the highly electroconductive sheet.

* * * * *